April 3, 1928.
D. C. KLAUSMEYER
1,664,888
NESTED CONTROL FOR BOTH CLAMP AND SPEEDS
Filed March 31, 1925    2 Sheets-Sheet 1
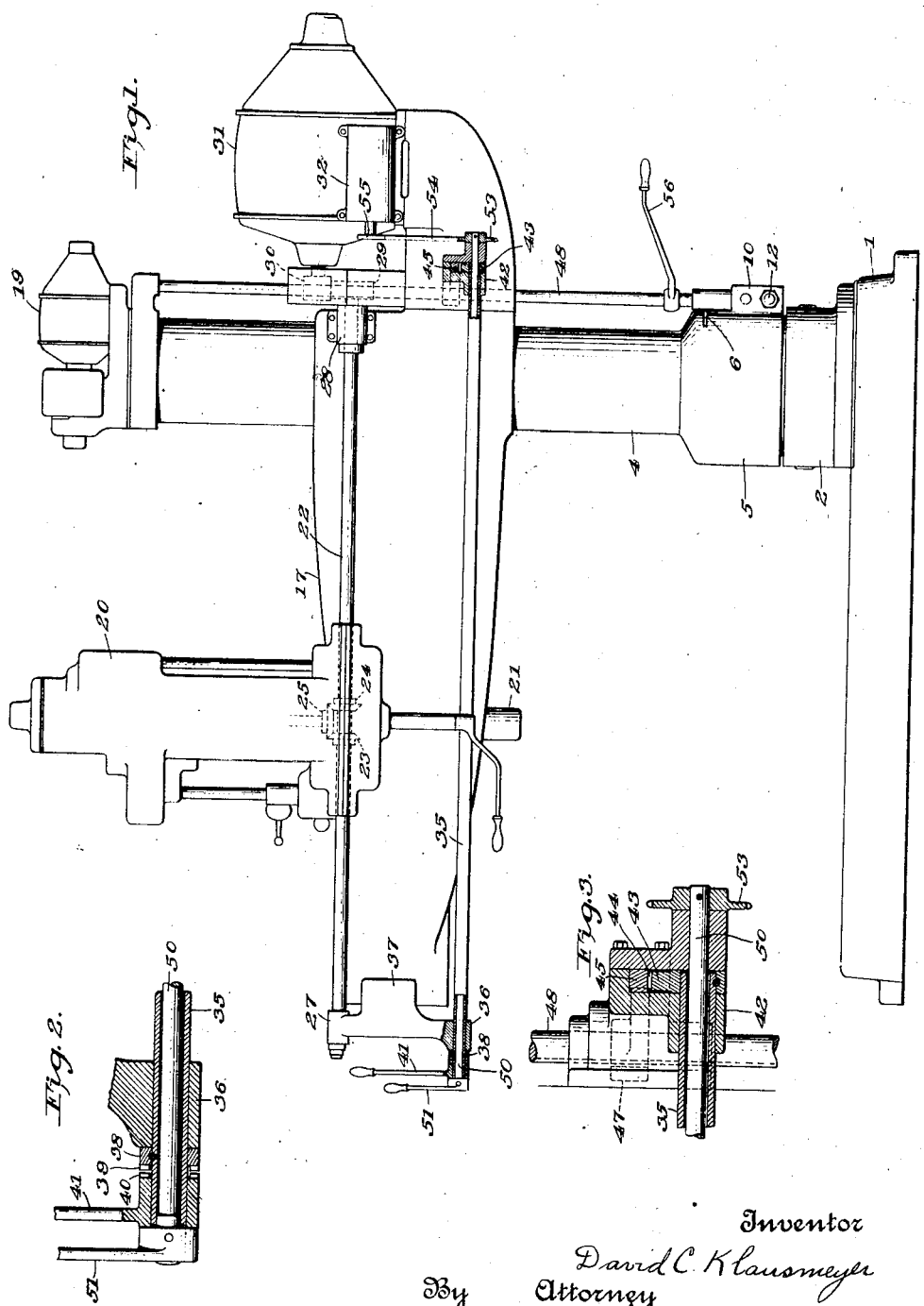
Inventor
David C. Klausmeyer
By Attorney
Albert F. Nathan April 3, 1928.
D. C. KLAUSMEYER
1,664,888
NESTED CONTROL FOR BOTH CLAMP AND SPEEDS
Filed March 31, 1925 2 Sheets-Sheet 2
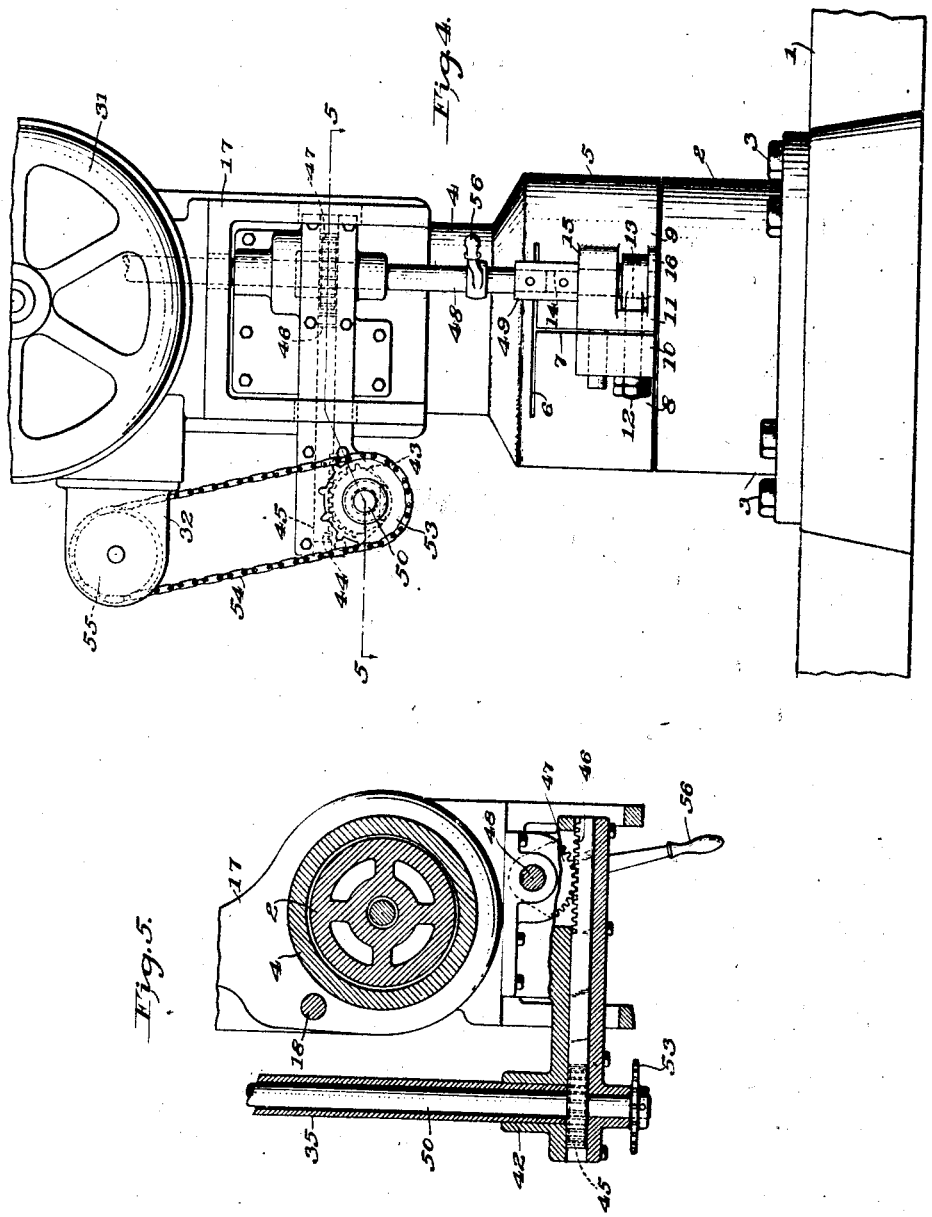

Patented Apr. 3, 1928.

1,664,888

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

NESTED CONTROL FOR BOTH CLAMP AND SPEEDS.

Application filed March 31, 1925. Serial No. 19,666.

My invention is concerned with controlling mechanism for a radial drilling machine and is chiefly concerned with the means for clamping the radial arm against rotative movement and with the mechanism for governing the operation of the drill spindle which is carried by the drill head.

In radial drilling machines of modern construction a radial arm, which carries a drill head, is vertically slidable on and rotative about a post or column. The drill head is slidably mounted on the radial arm and carries a drill spindle which is selectively operated at various speeds. In such a machine it is essential to clamp the radial arm against any rotative movement before a drilling operation can be effected. The clamp, which prevents rotative movement of the radial arm, is located adjacent to the column and accordingly is in a position inconvenient to be governed by the machine operator who is usually stationed near the drill head or at the outer end of the radial arm.

One of the chief objects of my invention is to provide a radial drilling machine that shall have control means operative from the outer end of the radial arm for not only controlling the power means connected to the drill spindle but also for operating the clamping mechanism. By providing such controlling means at the outer end of the radial arm it is possible for the operator to set the radial arm and the drill head, to clamp the radial arm against rotative movement, and to control the power means connected to the drill spindle without leaving his position near the outer end of the radial arm.

My invention is particularly adapted to control the clamping against rotative movement of a radial arm which is mounted on a rotative sleeve member. The sleeve member is rotatable on a stationary post or column and the radial arm is vertically movable on the sleeve member. The rotative movement of the radial arm is obtained by rotating the sleeve member on the post or column. In carrying out my invention a hollow shaft is extended from the outer end of the radial arm to a point adjacent to the sleeve member. The inner end of the hollow shaft is connected to mechanism for directly operating the clamp which prevents rotative movement of the sleeve member. A hand lever is adapted to be connected to the outer end of the hollow shaft for controlling the clamping of the sleeve member from the outer end of the radial arm. A control shaft, which extends through the above mentioned hollow shaft, is provided for governing the operation of a motor which is mounted on the inner end of the radial arm. The control shaft is connected to a controller preferably of the drum type which governs the operation of the motor on the radial arm. The motor is connected to the drill head for operating the drill carrying spindle. A hand lever is connected to the control shaft at the outer end of the radial arm for rotating the control shaft in accordance with the desired operation of the motor.

Other objects and advantages will be in part indicated in the following description and in part rendered apparent therefrom in connection with the annexed drawings.

To enable other skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is an elevational view of a radial drill having a controlled mechanism constructed in accordance with my invention. Fig. 2 is a sectional view of the outer ends of the control shafts. Fig. 3 is a sectional view of the inner ends of the control shafts. Fig. 4 is an inner end elevational view of the radial drill shown in Fig. 1. Fig. 5 is a view partly in section along the line 5—5 of Fig. 4.

Referring to the drawings a radial drill is illustrated comprising a base 1 upon which is secured a post or column 2 by means of bolts 3. The post or column 2 is in the form of a hollow tubular casting and supports a tubular sleeve member 4. The tubular sleeve member 4 is supported at its upper end by a suitable ball and thrust bearing which being entirely conventional is not illustrated in detail on the drawings. The lower part of the sleeve member 4 is enlarged to form a bell-shaped portion 5 which is circumferentially cut as indicated by the reference character 6 in Figs. 1 and 4 of the drawings. The bell-shaped portion 5 is moreover transversely cut as indicated by the reference character 7. The cuts thus made in the bell-shaped portion 5 of the sleeve provide slightly flexible wings 8 and 9 which are provided with lugs 10 and 11. The lugs 10 and 11 are adapted to be drawn together by means of a draw bolt 12 for clamping the bell-shaped portion 5 of the sleeve member 4 to the column or post 2. The draw bolt 12 is operated by means of an eccentric 13 on the end of a shaft 14 which is journaled in brackets 15 and 16. The brackets 15 and 16 project from the bell-shaped portion 5 of the sleeve 4. Thus by rotating the shaft 14 through a partial rotation, the sleeve may be clamped or unclamped at will to the post or column. It is one feature of my invention to control the operation of the shaft 14 and accordingly the clamping operation from the outer end of the radial arm of the drill.

A radial arm 17 is splined to the sleeve 4 and is vertically movable on the sleeve by means of a screw shaft 18. The screw shaft 18 is operated by means of a motor 19 through suitable gearing mounted on the top of the column 2. The radial arm 17 carries a drill head 20 which in turn carries a drill spindle 21. The drill spindle 21 is operated by means of an arm shaft 22 which extends along the back of the radial arm as best shown in Fig. 1 of the drawings. Two bevel gear wheels 23 and 24, which are splined to the arm shaft 22, are adapted to engage a bevel gear wheel 25. The bevel gear wheel 25 is connected through suitable gearing to the drill spindle 21. Inasmuch as my invention is not particularly related to the exact gearing contained in the drill head 20 it is deemed unnecessary to illustrate and describe such gearing.

The arm shaft 22, which is provided with bearings 27 and 28 on the radial arm 17, is connected by means of gear wheels 29 and 30 to a motor 31 which is mounted on the end of the radial arm 17 extending beyond the sleeve member 4 and post 2. The motor 31 is controlled by means of a controller 32 which is preferably of the drum type. A further important feature of my invention is to operate such controller 32 from the outer end of the radial arm.

A hollow shaft 35 extends along the back side of the radial arm 17, as shown in Fig. 1 of the drawings. Such hollow shaft 35 is provided with a bearing 36 near the outer end thereof in a bracket 37 which is secured to the radial arm 17. A collar 38 is pinned to the shaft 35 adjacent to the bearing 36, as shown in Figs. 1 and 2 of the drawings. Such collar 38 is provided with teeth 39 which are adapted to mesh with teeth 40 on the hub portion of a hand-lever 41. The hand-lever 41 is rotatably mounted on the end of the hollow shaft 35 and is adapted to be shifted so as to mesh the teeth 40 with the teeth 39. Upon engagement between the teeth 39 and 40, the rotative movement of the shaft 35 is controlled by the hand-lever 41. Such shaft 35 controls the clamping of the sleeve member 5 to the post 2 in the manner to be hereinafter set forth.

The inner end of the shaft 35 is provided with a bearing 42 on the inner end of the radial arm 17. A segment 43 of a gear is keyed to the hollow shaft 35 adjacent to the bearing 42. Such gear segment 43 meshes with the teeth 44 on a rack 45. The rack 45 extends across the end of the radial arm and is provided with teeth 46 which mesh with a gear segment on a shaft 48. The shaft 48 extends along the sleeve member 4 and is connected to the shaft 14 by means of a coupling 49, as shown in Fig. 4 of the drawings. Thus, it is apparent rotative movement of the hollow shaft 35 serves to operate the rack member 45 which in turn rotates the shafts 48 and 14 for clamping and unclamping the sleeve member 4 to and from the column or post 2. A hand lever 56 is mounted on the shaft 48 for operating the clamping mechanism from the rear of the machine when so desired.

A control shaft 50 extends through the hollow shaft 35 and has a hand-lever 51 secured to the outer end thereof as shown in Figs. 1 and 2 of the drawings. The inner end of the control shaft 50 carries a sprocket wheel 53. The sprocket wheel 53 is connected by a chain 54 to a sprocket wheel 55 on the shaft of the drum controller 32. Thus the control shaft which is operated by the hand lever 51 controls the motor 31 through the instrumentality of the controller 32.

In the above described construction it will be noted the clamping means for securing the sleeve to the column and the power means for operating the drill spindle are controlled by two levers located at the end of the radial arm. When setting the radial arm for a drilling operation the operator is usually near the outer end of the arm and accordingly in a position to operate the levers 41 and 51 which respectively control the clamping of the sleeve and the operation of the drill spindle 21. The control means comprising the shafts 35 and 50 are positioned on the back of the radial arm and by reason of mounting one within the other, take up very little room.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either of the generic or specific aspects of this invention and, therefore, such adapta- Having thus revealed this invention, I claim as new and desire to secure the following combinations and elements, or equivalents thereof, by Letters Patent of the United States:—

1. In a radial drill, the combination comprising a column; a radial arm mounted on said column and adapted to have vertical movement on and rotative movement about said column; clamping mechanism for preventing rotative movement of the arm; a drill head slidably mounted on said arm and carrying a drill spindle; a motor mounted on the inner end of said arm for operating said drill spindle; a hollow shaft extending along said arm; a control shaft extending through said hollow shaft; control levers adapted to be connected to the outer ends of said shafts for rotating them; and means operated by said shafts for controlling said motor and for operating said clamping mechanism.

2. In a radial drill, the combination comprising a column; a sleeve member rotatably mounted on said column; a radial arm mounted on said sleeve and adapted to have vertical movement thereon; clamping mechanism for preventing rotative movement of said sleeve; a drill head slidably mounted on said arm and carrying a drill spindle; a motor carried on the inner end of said arm for operating said drill spindle; a hollow shaft extending along the arm and operated by a handle secured at the outer end thereof; a control shaft extending through said hollow shaft and operated by a handle secured at the outer end thereof; and means operated by said shafts for controlling said motor and for operating said clamping mechanism.

3. In a radial drill, the combination comprising a column; a radial arm mounted on said column and adapted to have vertical movement on and rotative movement about said column; clamping mechanism for preventing rotative movement of the arm; a drill head slidably mounted on said arm and carrying a drill spindle; a motor mounted on the inner end of said arm for operating said drill spindle; a hollow shaft extending along said arm and having a detachable handle connected to the outer end thereof; a control shaft extending through said hollow shaft and having an operating handle mounted on the outer end thereof; a controller operated by said control shaft for governing the operation of said motor; and means operated by said hollow shaft for operating said clamping mechanism.

4. In a radial drill, the combination comprising a column; a radial arm mounted on said column and adapted to have vertical movement on and rotative movement about said column; clamping mechanism for preventing rotative movement of the arm; a drill head slidably mounted on said arm and carrying a drill spindle; power means for operating said drill spindle; a hollow shaft extending along said arm; a control shaft projecting through said hollow shaft; hand levers connected to the outer ends of said shafts for operating them; and means operated by said shafts for controlling said power means and for operating said clamping mechanism.

5. In a radial drill the combination comprising a post; a sleeve rotatably mounted thereon; a radial arm vertically shiftable on said sleeve; a clamp for binding the sleeve to said post; a drill head mounted on said arm and carrying a drill spindle; power means for operating said spindle; a hollow shaft extending from the outer end of said arm to the rear thereof; mechanism operated by said hollow shaft for operating said clamp; a control shaft extending through said hollow shaft for controlling said power means; and operating control levers connected to the outer ends of said shafts.

6. In a radial drill the combination comprising a post; a sleeve rotatably mounted thereon; a radial arm vertically shiftable on said sleeve; a clamp for binding the sleeve to said post; a drill head mounted on said arm and carrying a drill spindle; power means for operating said spindle; and means comprising a hollow shaft extending along the radial arm and a shaft extending through the hollow shaft for controlling the power means and for operating said clamp from the outer end of said arm.

7. In a radial drill the combination comprising a post; a sleeve rotatably mounted thereon; a radial arm vertically shiftable on said sleeve; a clamp for binding the sleeve to said post; a drill head slidably mounted on said arm and having a drill spindle mounted thereon; a motor carried on the radial arm at the end adjacent to said sleeve for operating said drill spindle; a hollow shaft extending along the arm; a control shaft mounted within said hollow shaft; means connected to the rear end of said hollow shaft for operating said clamp; means connected to the rear end of said central shaft for governing the operating of said motor; and control handles respectively mounted on the front ends of the hollow shaft and the control shaft.

8. In a radial drill the combination comprising a post; a sleeve rotatably mounted thereon; a radial arm vertically shiftable on said sleeve; a clamp for binding the sleeve to said post; a drill head mounted on said arm; a motor carried on the radial arm at the end adjacent to said sleeve for operating the drill spindle on said drill head; a hollow shaft extending from the outer end of said arm to the rear thereof; mechanism operated by said hollow shaft for operating said clamp; a controller located on the radial arm adjacent to said motor; a control shaft extending through said hollow shaft for operating said controller; and control handles respectively mounted on the outer end of the hollow shaft and the outer end of the control shaft for operating said clamp and said controller.

9. In a radial drill, the combination comprising a post; a sleeve rotatably mounted thereon; a radial arm vertically shiftable on said sleeve; a clamp for binding the sleeve to said post; a drill head mounted on said arm and carrying a drill spindle; power means for operating said spindle; a vertical shaft carried by said sleeve for operating said clamp, said vertical shaft having a hand lever mounted thereon; and means comprising a hollow shaft extending along the radial arm and a shaft extending through the hollow shaft for controlling the power means and for operating said vertical shaft from the outer end of said arm.

In witness whereof, I have hereunto subscribed my name.

DAVID C. KLAUSMEYER.